(12) United States Patent
Takeda (10) Patent No.: US 9,136,718 B2
(45) Date of Patent: Sep. 15, 2015

(54) CHARGE AND DISCHARGE CONTROL CIRCUIT, AND CHARGE AND DISCHARGE CONTROL METHOD

(71) Applicant: Takashi Takeda, Tokyo (JP)

(72) Inventor: Takashi Takeda, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 200 days.

(21) Appl. No.: 14/059,587

(22) Filed: Oct. 22, 2013

(65) Prior Publication Data

US 2014/0253041 A1    Sep. 11, 2014

(30) Foreign Application Priority Data

Mar. 5, 2013  (JP) .................................. 2013-042853

(51) Int. Cl.
*H02J 7/00* (2006.01)
*H01M 10/44* (2006.01)

(52) U.S. Cl.
CPC ............. *H02J 7/0029* (2013.01); *H01M 10/44* (2013.01); *H02J 7/0031* (2013.01); *H02J 2007/004* (2013.01); *H02J 2007/0037* (2013.01); *H02J 2007/0039* (2013.01)

(58) Field of Classification Search
CPC ............ H02J 7/0031; H02J 2007/0004; H02J 2007/0037; H02J 7/0073; H02J 7/0078; H02J 7/0093; H02J 7/0047; Y02E 60/12; H01M 10/48; G01R 31/3648

USPC .......................................... 320/133, 134, 136
See application file for complete search history.

(56) References Cited

U.S. PATENT DOCUMENTS

| 8,859,124 B2* | 10/2014 | Tanno ............................. 429/93 |
| 2001/0026147 A1 | 10/2001 | Nakashimo |
| 2007/0188142 A1 | 8/2007 | Nakashimo |
| 2011/0267726 A1* | 11/2011 | Ikeuchi et al. .................. 361/63 |
| 2013/0063090 A1* | 3/2013 | Takeshita et al. ............. 320/126 |

FOREIGN PATENT DOCUMENTS

| JP | 2001-283932 | 10/2001 |
| JP | 2007-195303 | 8/2007 |

* cited by examiner

*Primary Examiner* — Richard Isla Rodas
*Assistant Examiner* — Mohammad Jameel Sharief
(74) *Attorney, Agent, or Firm* — IPUSA, PLLC (57) ABSTRACT

In a charge and discharge control circuit, a mode control part manages a normal mode in which voltages at a power terminal and an overcurrent detection terminal are monitored, a time-shortening mode in which predetermined delay times for detecting an overcharge, an overdischarge, and an overcurrent are shortened, and a protection mode in which a signal to stop a charge current or a discharge current is output when an abnormality is detected in the normal mode. A transition is made from the normal mode to the time-shortening mode when the voltage at the power terminal exceeds a predetermined value, and a transition is made from the time-shortening mode to the protection mode when one of the overcharge, overdischarge, and overcurrent is detected.

8 Claims, 4 Drawing Sheets

CHARGE AND DISCHARGE CONTROL CIRCUIT, AND CHARGE AND DISCHARGE CONTROL METHOD

CROSS-REFERENCE TO RELATED APPLICATIONS

This application is based upon and claims the benefit of priority of Japanese Patent Application No. 2013-042853, filed on Mar. 5, 2013, the entire contents of which are incorporated herein by reference.

BACKGROUND OF THE INVENTION

1. Field of the Invention

The present invention relates to a charge and discharge control circuit and a charge and discharge control method to control charge and discharge of a secondary battery or a rechargeable battery.

2. Description of the Related Art

Recently, a lithium ion battery is used as a secondary battery in portable apparatuses, such as a digital camera. The lithium ion battery is weak with respect to an overcharge voltage and an overdischarge voltage. Hence, the lithium ion battery is used in the form of a battery pack that is provided with a charge and discharge control circuit, that is, a protection circuit to protect the lithium ion battery from the overcharge voltage and the overdischarge voltage.

The protection circuit may be integrated in the form of a semiconductor integrated circuit, that is, a protection IC (Integrated Circuit), to include an overcharge voltage detection circuit, an overdischarge voltage detection circuit, a charge overcurrent detection circuit, a discharge overcurrent detection circuit, and the like. The protection IC stops discharge of the lithium ion battery by cutting off a discharge stopping MOS (Metal Oxide Semiconductor) transistor when the overdischarge voltage detection circuit detects an overdischarge voltage or the discharge overcurrent detection circuit detects a discharge overcurrent. In addition, the protection IC stops charging of the lithium ion battery by cutting off a charge stopping MOS transistor when the overcharge voltage detection circuit detects an overcharge voltage or the charge overcurrent detection circuit detects a charge overcurrent.

In the overcharge voltage detection circuit, the overdischarge voltage detection circuit, the charge overcurrent detection circuit, and the discharge overcurrent detection circuit described above, the overcharge voltage detection, the overdischarge voltage detection, the charge overcurrent detection, and the discharge overcurrent detection are determined or made definite when detection times of each of these detection circuits are measured and the measured detection times exceed corresponding delay times (predetermined times) that are set with respect to each of these detection circuits, in order to prevent an erroneous operation by cutting off the corresponding MOS transistors. In other words, a predetermined time is required until each of the overcharge voltage detection, the overdischarge voltage detection, the charge overcurrent detection, and the discharge overcurrent detection is determined or made definite.

However, when testing the protection IC at the time of manufacture, there is a problem in that a test time becomes long because a delay time is required for each of the overcharge voltage detection, the overdischarge voltage detection, the charge overcurrent detection, and the discharge overcurrent detection. For this reason, at the time of the testing, a time-shortening mode is set in the protection IC in order to reduce or eliminate the delay time described above.

Japanese Laid-Open Patent Publication No. 2007-195303 proposes a technique that provides a voltage detection circuit to detect a state in which a voltage greater than or equal to a prescribed value is applied across a power detection terminal and a power terminal of a charge and discharge control circuit, in order to reduce the delay time of an internal control circuit according to a detection signal output from the voltage detection circuit.

One example of the conventional protection IC is provided with a test mode terminal (time-shortening mode terminal), and is set to a normal mode with a normal delay time or a delay time shortening mode (time-shortening mode) depending on whether an input signal level to the test mode terminal is a high level (VDD) or a low level (VSS). However, in this case, the protection IC must be additionally provided with the test mode terminal, and the cost of the protection IC increases due to the need to provide the additional test mode terminal.

In another example of the conventional protection IC, a threshold value VTH higher than the power supply voltage VDD that is normally supplied to the power terminal is set, and the mode is set to the time-shortening mode which shortens the delay time when the voltage at the power terminal is higher than the threshold value VTH, and to the normal mode which uses the normal delay time when the voltage at the power terminal is the threshold value VTH or lower. In this case, it is unnecessary to add the test mode terminal to the protection IC, however, the lithium ion battery is put into an overcharge voltage state during the time in which the voltage at the power terminal is higher than the threshold value VTH. For this reason, even when the time-shortening mode is set, there is a problem in that the functions of the overcharge voltage detection circuit cannot be tested.

SUMMARY OF THE INVENTION

Accordingly, it is an object in one embodiment of the present invention to provide a charge and discharge control circuit and a charge and discharge control method that may prevent the number of terminals from increasing in order to set a time-shortening mode and enable testing of each of detection functions when the time-shortening mode is set.

According to one aspect of the present invention, a charge and discharge control circuit to control charge and discharge of a secondary battery may include a power terminal configured to receive power from the secondary battery; an overcurrent detection terminal configured to detect an overcurrent of the secondary battery; an abnormality detection part set with predetermined delay times for detecting an overcharge, an overdischarge, and an overcurrent; and a mode control part configured to control a plurality of modes of operation, wherein the mode control part includes managing a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode; making a transition from the normal mode to the time-shortening mode when the voltage at the power terminal monitored by the abnormality detection part exceeds a first predetermined voltage; making a transition from the time-shortening mode to the protection mode when either one of the overdischarge and the overcurrent is detected by the abnormality detection part; wherein the protection mode includes an overcharge protection mode in which the overcharge current is detected by one of the predetermined delay times of the abnormality detection part, wherein the time-shortening mode includes a time-shortening monitor mode in which voltages at the power terminal and the overcurrent detection terminal are monitored by the abnormality detection part, and a time-shortening overcharge voltage detection mode in which the signal to stop the charge current is output when the overcharge is detected by the abnormality detection part, and making a transition to the time-shortening overcharge voltage detection mode when the overcharge is detected in the time-shortening monitor mode, making a transition to the time-shortening monitor mode when the overcharge detection of the abnormality detection part ends, and making a transition to the overcharge protection mode when the voltage at the overcurrent detection terminal is lower than a second predetermined voltage in the time-shortening overcharge voltage detection mode.

According to another aspect of the present invention, a charge and discharge control circuit to control charge and discharge of a secondary battery may include a power terminal configured to receive power from the secondary battery; an overcurrent detection terminal configured to detect an overcurrent of the secondary battery; an abnormality detection part set with predetermined delay times for detecting an overcharge, an overdischarge, and an overcurrent; and a mode control part configured to control a plurality of modes of operation, wherein the mode control part includes managing a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode; making a transition from the normal mode to the time-shortening mode when a voltage at the overcurrent detection terminal monitored by the abnormality detection part exceeds a first predetermined voltage; making a transition from the time-shortening mode to the protection mode when either one of the overdischarge and the overcurrent is detected by the abnormality detection part; wherein the protection mode includes a charge overcurrent protection mode in which the charge overcurrent is detected by one of the predetermined delay times of the abnormality detection part, wherein the time-shortening mode includes a time-shortening monitor mode in which the voltages at the power terminal and the overcurrent detection terminal are monitored by the abnormality detection part, and a time-shortening charge overcurrent detection mode in which the signal to stop the charge current is output when the charge overcurrent is detected by the abnormality detection part, and making a transition to the time-shortening charge overcurrent detection mode when the charge overcurrent is detected by the abnormality detection part in the time-shortening monitor mode, making a transition to the time-shortening monitor mode when the charge overcurrent detection of the abnormality detection part ends, and making a transition to the charge overcurrent protection mode when the voltage at the power terminal monitored by the abnormality detection part exceeds a second predetermined voltage in the time-shortening charge overcurrent detection mode.

According to a further aspect of the present invention, a charge and discharge control method controls charge and discharge of a secondary battery by a charge and discharge control circuit that includes a power terminal configured to receive power from the secondary battery, an overcurrent detection terminal configured to detect an overcurrent of the secondary battery, an abnormality detection part set with predetermined delay times for detecting an overcharge, an overdischarge, and an overcurrent, and a mode control part configured to control a plurality of modes of operation, and the charge and discharge control method may include managing, by the mode control part, a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode; making, by the mode control part, a transition from the normal mode to the time-shortening mode when the voltage at the power terminal monitored by the abnormality detection part exceeds a first predetermined voltage; making, by the mode control part, a transition from the time-shortening mode to the protection mode when either one of the overdischarge and the overcurrent is detected by the abnormality detection part; wherein the protection mode includes an overcharge protection mode in which the overcharge current is detected by one of the predetermined delay times of the abnormality detection part, wherein the time-shortening mode includes a time-shortening monitor mode in which voltages at the power terminal and the overcurrent detection terminal are monitored by the abnormality detection part, and a time-shortening overcharge voltage detection mode in which the signal to stop the charge current is output when the overcharge is detected by the abnormality detection part, and making, by the mode control part, a transition to the time-shortening overcharge voltage detection mode when the overcharge is detected by the abnormality detection part in the time-shortening monitor mode, a transition to the time-shortening monitor mode when the overcharge detection of the abnormality detection part ends, and a transition to the overcharge protection mode when the voltage at the overcurrent detection terminal monitored by the abnormality detection part is lower than a second predetermined voltage in the time-shortening overcharge voltage detection mode.

According to still another aspect of the present invention, a charge and discharge control method controls charge and discharge of a secondary battery by a charge and discharge control circuit that includes a power terminal configured to receive power from the secondary battery, an overcurrent detection terminal configured to detect an overcurrent of the secondary battery, an abnormality detection part set with predetermined delay times for detecting an overcharge, an overdischarge, and an overcurrent, and a mode control part configured to control a plurality of modes of operation, and the charge and discharge control method may include managing, by the mode control part, a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode; making, by the mode control part, a transition from the normal mode to the time-shortening mode when a voltage at the overcurrent detection terminal monitored by the abnormality detection part exceeds a second predetermined voltage; making, by the mode control part, a transition from the time-shortening mode to the protection mode when either one of the overdischarge and the overcurrent is detected by the abnormality detection part; wherein the protection mode includes a charge overcurrent protection mode in which the charge overcurrent is detected by one of the predetermined delay times of the abnormality detection part, wherein the time-shortening mode includes a time-shortening monitor mode in which the voltages at the power terminal and the overcurrent detection terminal are monitored by the abnormality detection part, and a time-shortening charge overcurrent detection mode in which the signal to stop the charge current is output when the charge overcurrent is detected by the abnormality detection part, and making, by the mode control part, a transition to the time-shortening charge overcurrent detection mode when the charge overcurrent is detected by the abnormality detection part in the time-shortening monitor mode, a transition to the time-shortening monitor mode when the charge overcurrent detection of the abnormality detection part ends, and a transition to the charge overcurrent protection mode when the voltage at the power terminal monitored by the abnormality detection part exceeds a second predetermined voltage in the time-shortening charge overcurrent detection mode.

Other objects and further features of the present invention will be apparent from the following detailed description when read in conjunction with the accompanying drawings.

DETAILED DESCRIPTION OF THE PREFERRED EMBODIMENTS

A description will be given of embodiments and modifications of the present invention, by referring to the drawings.

Protection IC in One Embodiment

Figure 1:
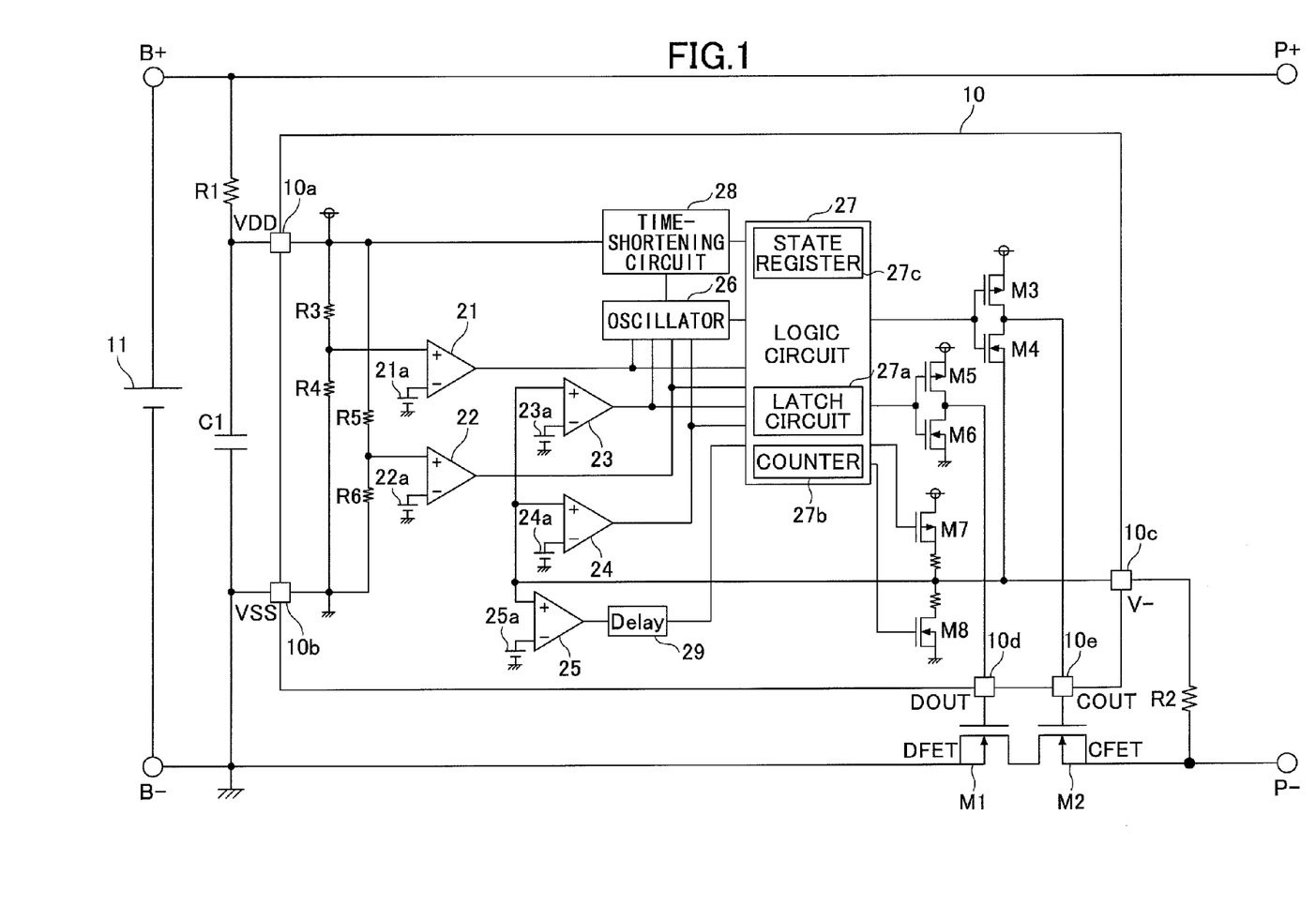
FIG. 1 is a diagram illustrating an example of a charge and discharge control circuit in one embodiment of the present invention.

FIG. 1 is a diagram illustrating an example of a charge and discharge control circuit in one embodiment of the present invention. In FIG. 1, the charge and discharge control circuit is integrated in the form of a semiconductor integrated circuit, that is, a protection IC (Integrated Circuit) 10. A battery cell 11 of a lithium ion battery, which is an example of a secondary or rechargeable battery, and a filter circuit formed by a resistor R1 and a capacitor C1, are connected in parallel and externally connected to the protection IC 10. A positive electrode B+ of the battery cell 11 is connected via a wiring to an external terminal P+ of a battery pack that accommodates the battery cell 11 and the protection IC. A negative electrode B− of the battery cell 11 is connected via a wiring and current cutoff n-channel MOS (Metal Oxide Semiconductor) transistors M1 and M2 to an external terminal P− of the battery pack.

Drains of the MOS transistors M1 and M2 are connected together, a source of the MOS transistor M1 is connected to the negative electrode B− of the battery cell 11, and a source of the MOS transistor M2 is connected to the external terminal P− of the battery pack.

A power supply voltage VDD is supplied from the positive electrode B+ of the battery cell 11 to a terminal 10a of the protection IC 10 via the resistor R1. A power supply voltage VSS is supplied from the negative electrode B− of the battery cell 11 to a terminal 10b of the protection IC 10. The protection IC 10 operates when supplied with the power supply voltages VDD and VSS. The power supply voltage VDD supplied from the battery cell 11 to the terminal 10a may be lower than or equal to an overcharge detection voltage.

In addition, one end of a resistor R2 is connected to a terminal 10c of the protection IC 10, the other end of the resistor R2 is connected to the external terminal P−, and a voltage V− is supplied to the terminal 10c. The resistor R2 corresponds to a protection resistance that is provided for protection purposes when a charger is connected in the wrong direction. A DOUT output terminal 10d of the protection IC 10 is connected to a gate of the MOS transistor M1, and a COUT output terminal 10e of the protection IC 10 is connected to a gate of the MOS transistor M2. The MOS transistor M1 is turned off by the protection IC 10 when stopping discharge, and the MOS transistor M2 is turned off by the protection IC 10 when stopping charging. The terminal 10a is an example of a power terminal supplied with power from the secondary battery, and the terminal 10c is an example of an overcurrent detection terminal for detecting an overcurrent of the secondary battery.

The protection IC 10 may include an overcharge voltage detection circuit 21, an overdischarge voltage detection circuit 22, a charge overcurrent detection circuit 23, a discharge overcurrent detection circuit 24, a short-circuit detection circuit 25, an oscillator 26, a logic circuit 27, a time-shortening circuit 28, and the like.

The overcharge voltage detection circuit 21 compares a divided voltage, which is obtained by voltage-dividing a voltage across the terminals 10a and 10b by resistors R3 and R4, and a first reference voltage Vdet1 from a first reference voltage source 21a, and generates an overcharge voltage detection signal when the divided voltage is higher than the first reference voltage Vdet1. This overcharge voltage detection signal is supplied to the oscillator 26 and the logic circuit 27. When converted into the voltage across the terminals 10a and 10b before the voltage-division, the first reference voltage Vdet1 may be approximately 4.3 V, for example. The first reference voltage Vdet1 is an example of a "third predetermined voltage".

The overdischarge voltage detection circuit 22 compares a divided voltage, which is obtained by voltage-dividing the voltage across the terminals 10a and 10b by resistors R5 and R6, and a second reference voltage Vdet2 from a second reference voltage source 22a, and generates an overdischarge voltage detection signal when the divided voltage is lower than the second reference voltage Vdet2. This overdischarge voltage detection signal is supplied to the oscillator 26 and the logic circuit 27. When converted into the voltage across the terminals 10a and 10b before the voltage-division, the second reference voltage Vdet2 may be approximately 2.4 V, for example. The second reference voltage Vdet2 is an example of a "fourth predetermined voltage".

The charge overcurrent detection circuit 23 compares the voltage at the terminal 10c and a fourth reference voltage Vdet4 from a fourth reference voltage source 23a, and generates a charge overcurrent detection signal when the voltage at the terminal 10c is lower than the fourth reference voltage Vdet4. This charge overcurrent detection signal is supplied to the oscillator 26 and the logic circuit 27. The fourth reference voltage Vdet4 may be approximately −100 mV, for example. The fourth reference voltage Vdet4 is an example of a "second predetermined voltage".

The discharge overcurrent detection circuit 24 compares the voltage at the terminal 10c and a third reference voltage Vdet3 from a third reference voltage source 24a, and generates a discharge overcurrent detection signal when the voltage at the terminal 10c is higher than the third reference voltage Vdet3. This discharge overcurrent detection signal is supplied to the oscillator 26 and the logic circuit 27. The third reference voltage Vdet3 may be approximately +100 mV, for example. The third reference voltage Vdet3 is an example of a "fifth predetermined voltage".

The short-circuit detection circuit 25 compares the voltage at the terminal 10c and a fifth reference voltage Vshort from a fifth reference voltage source 25a, and generates a short-circuit detection signal when the voltage at the terminal 10c is higher than the fifth reference voltage Vshort. The short-circuit detection signal is supplied to the logic circuit 27 via a delay circuit 29 which uses a time constant determined by a resistor and a capacitor, for example. The fifth reference voltage Vshort may be approximately +1.0 V, for example.

The oscillator 26 starts oscillation to generate and supply a clock signal to the logic circuit 27, when supplied with the overcharge voltage detection signal or the overdischarge voltage detection signal or the charge overcurrent detection signal or the discharge overcurrent detection signal.

The overcharge voltage detection circuit 21, the overdischarge voltage detection circuit 22, the charge overcurrent detection circuit 23, the discharge overcurrent detection circuit 24, and the short-circuit detection circuit 25 may form an example of an abnormality detection part that is set with predetermined delay times for detecting the overcharge, the overdischarge, and the overcurrent.

Figure 2:
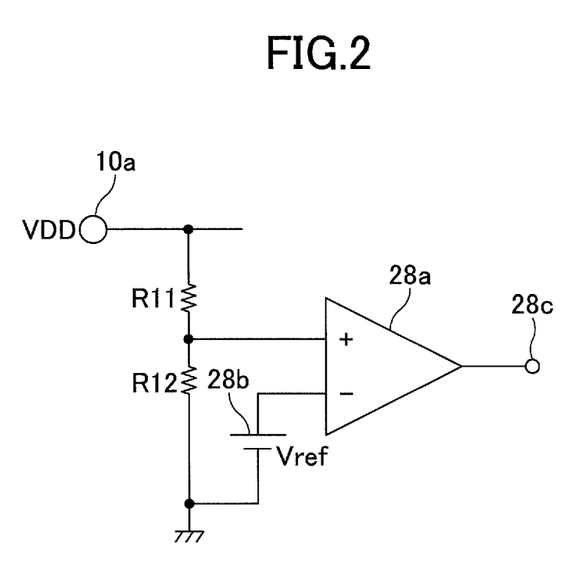
FIG. 2 is a circuit diagram illustrating a circuit configuration of a time-shortening circuit in one embodiment.

FIG. 2 is a circuit diagram illustrating a circuit configuration of the time-shortening circuit 28 in one embodiment. In FIG. 2, the time-shortening circuit 28 may include a comparator 28a and a reference voltage source 28b. The voltage VDD at the terminal 10a is voltage-divided into a divided voltage by resistors R11 and R12, and the divided voltage is supplied to a non-inverting input terminal of the comparator 28a. A sixth reference voltage Vds from the reference voltage source 28b is supplied to an inverting input terminal of the comparator 28a. The sixth reference voltage Vds is an example of a "first predetermined voltage". When converted into the voltage at the terminal 10a before the voltage-division, the sixth reference voltage Vds may be approximately 6 V, for example, and is higher than the overcharge detection voltage (for example, 4.3 V). The comparator 28a generates a time-shortening detection signal when the voltage at the terminal 10a is higher than the sixth reference voltage Vds, and this time-shortening detection signal is supplied from a terminal 28c to the oscillator 26 and the logic circuit 27.

The logic circuit 27 illustrated in FIG. 1 may include a latch circuit 27a, a counter 27b, and a state register 27c. The logic circuit 27 is an example of a mode control part that controls a plurality of modes of operation. In the logic circuit 27, the counter 27b may count the time for which the time-shortening detection signal is supplied to the logic circuit 27. When the counted value in the counter 27b exceeds a first predetermined time (for example, 1 msec), the latch circuit 27a latches a value (for example, a value 1) indicating a time-shortening mode. Thereafter, the latch circuit 27a latches a value (for example, a value 0) indicating a normal mode when the overdischarge voltage detection signal or the charge overcurrent detection signal or the discharge overcurrent detection signal is supplied to the logic circuit 27.

In addition, in the logic circuit 27, the counter 27b may count the time for which the overcharge voltage detection signal is supplied to the logic circuit 27. When the counted value in the counter 27b exceeds a second predetermined time, the state register 27c holds an overcharge voltage detection state. In this case, the logic circuit 27 sets an output COUT from the terminal 10e to a low level (value 0) via an inverter that is formed by MOS transistors M3 and M4, and turns the MOS transistor M2 off. Moreover, the logic circuit 27 sets an output DOUT from the terminal 10d to a high level (value 1) via an inverter that is formed by the MOS transistors M5 and M6, and turns the MOS transistor M1 on.

Further, in the logic circuit 27, the counter 27b may count the time for which the overdischarge voltage detection signal is supplied to the logic circuit 27. When the counted value in the counter 27b exceeds a third predetermined time, the state register 27c holds an overdischarge voltage detection state. In this case, the logic circuit 27 sets the output COUT from the terminal 10e to a high level in order to turn the MOS transistor M2 on, and sets the output DOUT from the terminal 10d to a low level in order to turn the MOS transistor M1 off.

In the logic circuit 27, the counter 27b may count the time for which the charge overcurrent detection signal is supplied to the logic circuit 27. When the counted value in the counter 27b exceeds a fourth predetermined time, the state register 27c holds a charge overcurrent detection state. In this case, the logic circuit 27 sets the output COUT from the terminal 10e to a low level in order to turn the MOS transistor M2 off, and sets the output DOUT from the terminal 10d to a high level in order to turn the MOS transistor M1 on.

In addition, in the logic circuit 27, the counter 27b may count the time for which the discharge overcurrent detection signal is supplied to the logic circuit 27. When the counted value in the counter 27b exceeds a fifth predetermined time, the state register 27c holds a discharge overcurrent detection state. In this case, the logic circuit 27 sets the output COUT from the terminal 10e to a high level in order to turn the MOS transistor M2 on, and sets the output DOUT from the terminal 10d to a low level in order to turn the MOS transistor M1 off.

When the short-circuit detection signal is supplied to the logic circuit 27, the state register 27c holds a short-circuit detection state. In this case, the logic circuit 27 sets the output COUT from the terminal 10e to a high level in order to turn the MOS transistor M2 on, and sets the output DOUT from the terminal 10d to a low level in order to turn the MOS transistor M1 off. The delay time of the delay circuit 29 may be set to a sixth predetermined time. An optimum value may be set for each of the first through sixth predetermined times.

The MOS transistors M3, M4, M5, and M6 may form an example of a signal output part that outputs a signal to stop the charge current or the discharge current when the abnormality is detected by the abnormality detection part in the normal mode.

The logic circuit 27 may turn a MOS transistor M7 on in the overdischarge voltage detection state in order to perform a pull-up on the terminal 10c, and may turn a MOS transistor M8 on in the discharge overcurrent detection state or the short-circuit detection state in order to perform a pull-down on the terminal 10c.

In the time-shortening mode, the logic circuit 27 may set the values of the first through fifth predetermined times to approximately 1/10 the values of the first through fifth predetermined times during the normal mode or less. Alternatively, the logic circuit 27 may set the values of the first through fifth predetermined times during the time-shortening mode to zero (0).

[State Transition of Charge and Discharge Control Circuit]

Figure 3:
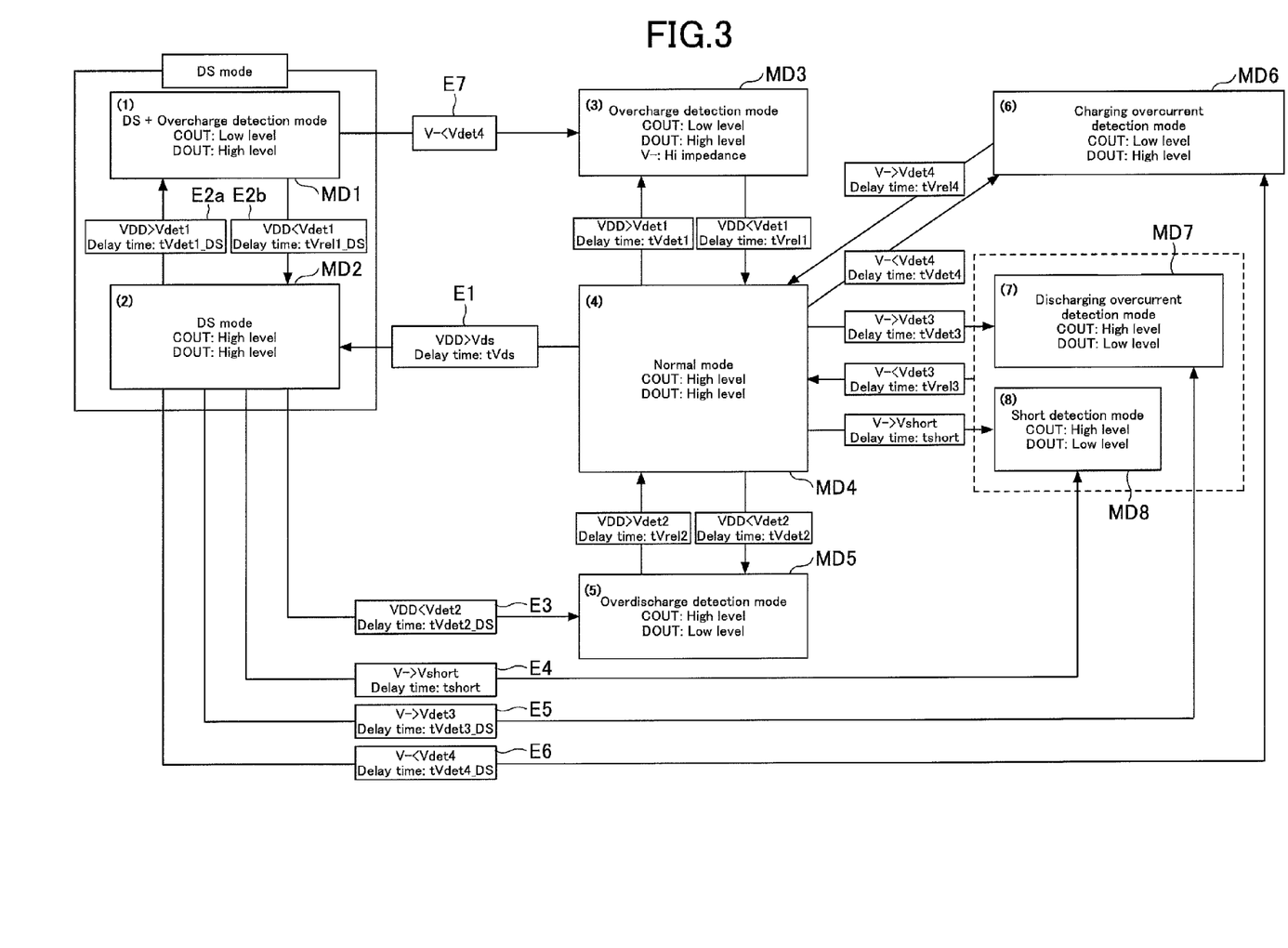
FIG. 3 is a state transition diagram for explaining an operation of a protection IC in one embodiment.

FIG. 3 is a state transition diagram for explaining an operation of the protection IC 10 in one embodiment. In a normal mode state MD4, a high-level signal is supplied to the gates of the MOS transistors M1 and M2 in order to turn both the MOS transistors M1 and M2 on.

In the normal mode state MD4, a transition is made to a time-shortening mode state (or DS mode state) MD2 when an event E1 occurs in which the voltage VDD exceeds the sixth reference voltage Vds. In FIG. 3, the first and second reference voltages Vdet1 and Vdet2 indicate voltages when converted into the voltage across the terminals 10a and 10b before the voltage-division. The time-shortening mode is a test mode.

When VDD>Vds stands, VDD>Vdet1 also stands.

Hence, when the event E1 ends after the first predetermined time, and an event E2 occurs in which VDD>Vdet1 stands exceeding the second predetermined time, a transition is made to a time-shortening and overcharge voltage detection state MD1. Thereafter, when an event E2b occurs in which VDD<Vdet1 stands exceeding the second predetermined time, a transition is made to the time-shortening mode state MD2. The time-shortening mode state MD2 short-circuits the second through fifth predetermined times to supply a high level to the gates of the MOS transistors M1 and M2, and is similar to the normal mode state MD4 in this respect.

In the time-shortening mode state MD2, when an event E3 occurs in which VDD<Vdet2 stands exceeding the third predetermined time, a transition is made to an overdischarge voltage detection state MD5 of the normal mode. In addition, in the time-shortening mode state MD2, when an event E4 occurs in which the voltage V− at the terminal 10c satisfies V−>Vshort and this state exceeds the sixth predetermined time, a transition is made to a short-circuit detection state MD8 of the normal mode.

In addition, in the time-shortening mode MD2, when an event E5 occurs in which V−>Vdet3 exceeds the fifth predetermined time, a transition is made to a discharge overcurrent detection state MD7 of the normal mode. Moreover, in the time-shortening mode MD2, when an event E6 occurs in which V−<Vdet4 exceeds the fourth predetermined time, a transition is made to a charge overcurrent detection state MD6 of the normal mode.

Furthermore, in the time-shortening and overcharge voltage detection state MD1, when an event E7 occurs in which V−<Vdet4 and the charge overcurrent detection signal is generated, a transition is made to an overcharge voltage detection state MD4 of the normal mode.

The normal mode state MD4 is an example of a normal mode in which the voltages at the power terminal and the overcurrent detection terminal are monitored. The time-shortening mode and overcharge voltage detection state MD1 and the time-shortening mode state MD2 are examples of a time-shortening mode in which the predetermined delay times for detecting the overcharge, the overdischarge, and the overcurrent in the abnormality detection part are shortened. The overcharge voltage detection state MD3, the overdischarge voltage detection state MD5, the charge overcurrent detection state MD6, the discharge overcurrent detection state MD7, and the short-circuit detection state MD8 are examples of a protection mode in which a signal is output to stop a charge current or a discharge current when an abnormality is detected by the abnormality detection part in the normal mode. The time-shortening mode state MD2 is an example of a time-shortening monitor mode, and the time-shortening and overcharge voltage detection state MD1 is an example of a time-shortening overcharge voltage detection mode.

Examples of Test

A function test (1) tests the functions of the overdischarge voltage detection circuit 22 by making a transition from the normal mode state MD4 to the time-shortening mode state MD2 in response to the event E1. By this function test (1), a transition is made to the overdischarge voltage detection state MD5 of the normal mode when the event E3 occurs in which VDD<Vdet2 exceeds the third predetermined time. Thereafter, a transition is made to the normal mode state MD4 when an event occurs in which VDD>Vdet2 exceeds the third predetermined time.

A function test (2) tests the functions of the short-circuit detection circuit 26 by making a transition from the normal mode state MD4 to the time-shortening mode state MD2 in response to the event E1. By this function test (2), a transition is made to the short-circuit detection state MD8 of the normal mode when the event E4 occurs in which V−>Vshort exceeds the sixth predetermined time. Thereafter, a transition is made to the normal mode state MD4 when an event occurs in which V−<Vdet3 exceeds the fifth predetermined time.

A function test (3) tests the functions of the charge overcurrent detection circuit 23 by making a transition from the normal mode state MD4 to the time-shortening mode state MD2 in response to the event E1. By this function test (3), a transition is made to the charge overcurrent detection state MD6 of the normal mode when the event E6 occurs in which V−<Vdet4 exceeds the fourth predetermined time. Thereafter, a transition is made to the normal mode state MD4 when an event occurs in which V−<Vdet4 exceeds the fourth predetermined time.

A function test (4) tests the functions of the discharge overcurrent detection circuit 24 by making a transition from the normal mode state MD4 to the time-shortening mode state MD2 in response to the event E1. By this function test (4), a transition is made to the discharge overcurrent detection state MD7 of the normal mode when the event E5 occurs in which V−>Vdet3 exceeds the fifth predetermined time. Thereafter, a transition is made to the normal mode state MD4 when an event occurs in which V−<Vdet3 exceeds the fifth predetermined time.

A function test (5) tests the functions of the overcharge voltage detection circuit 21 by making a transition from the normal mode state MD4 to the time-shortening mode state MD2 in response to the event E1. By this function test (4), a transition is made to the time-shortening and overcharge voltage detection state MD1 when the event E2a occurs in which VDD>Vdet1 exceeds the second predetermined time. In this case, a transition is not made to the overcharge voltage detection state MD3 of the normal mode, unlike in the other function tests. This is because, in response to the event E1, a transition is made from the time-shortening mode state MD2 to the time-shortening mode and overcharge voltage detection state MD1 and then to the time-shortening mode state MD2, and the state is stable in the time-shortening mode state MD2.

Accordingly, after the function test (4) of the overcharge voltage detection circuit 21, a transition is made to the overcharge voltage detection state MD3 of the normal mode when the event E7 occurs in which the charge overcurrent detection signal is generated when V−<Vdet4. Thereafter, a transition is made to the normal mode MD4 when an event occurs in which VDD>Vdet1 exceeds the second predetermined time.

Therefore, a transition is made from the time-shortening mode to the normal mode every time each of the function tests (1) through (5) is performed. For this reason, even if not all of the functions are tested before forwarding the protection IC 10, the protection IC 10 may always be set to the normal mode when forwarding the protection IC 10. Of course, an order in which the function tests (1) through (5) are performed is not limited to the order described above, and the order may be set arbitrarily.

Modification

In the embodiment described above, the time-shortening mode is set by supplying a voltage on the order of approximately 6 V, which is higher than the normal power supply voltage (for example, 4.5 V), to the terminal 10a for a short time. However, the time-shortening mode may be set by supplying a voltage lower than the voltage Vds1 (for example, on the order of approximately −2.0 V) which is lower than the voltage Vdet4, to the terminal 10c. In this case, the terminal 10c is connected to the time-shortening circuit 28, and the comparator 28a compares the voltage V− at the terminal 10c that is supplied to the non-inverting input terminal without being voltage-divided and the seventh reference voltage Vds1 that is supplied to the inverting input terminal from the reference voltage source 28b. Further, the comparator 28a in this case generates the time-shortening detection signal when V−<Vds1.

[State Transition in Modification]

Figure 4:
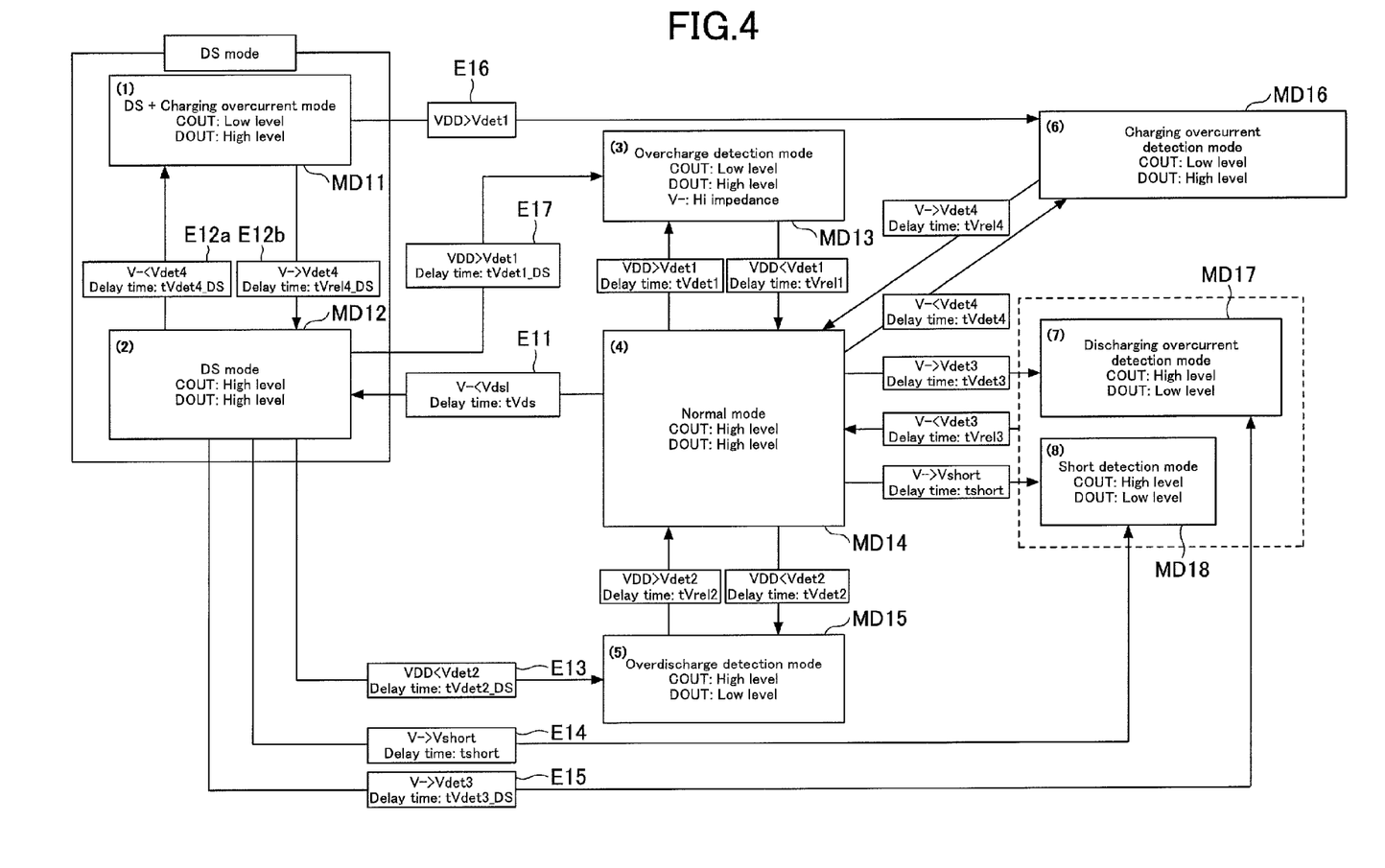
FIG. 4 is a state transition diagram for explaining an operation of the protection IC in a modification.

FIG. 4 is a state transition diagram for explaining an operation of the protection IC 10 in a modification. In a normal mode state MD14, a high-level signal is supplied to the gates of the MOS transistors, M1 and M2 in order to turn both the MOS transistors M1 and M2 on. In the normal mode state MD14, a transition is made to a time-shortening mode (or DS mode) MD12 when an event E11 occurs in which the voltage V− becomes lower than the sixth reference voltage Vds1.

In addition, when V−<Vds1 stands, V−<Vdet4 also stands. Hence, when the event E11 ends, a transition is made to a time-shortening and charge overcurrent detection state MD11 when an event E12a occurs in which V−<Vdet4 exceeds the fourth predetermined time. Thereafter, a transition is made to the time-shortening mode state MD12 when an event E12b occurs in which V−>Vdet4 exceeds the fourth predetermined time.

In the time-shortening mode state MD12, a transition is made to an overdischarge voltage detection state MD15 of the normal mode when an event E13 in which VDD<Vdet2 exceeds the third predetermined time. In addition, in the time-shortening mode state MD12, a transition is made to a short-circuit detection state MD18 of the normal mode when the voltage V− at the terminal 10c becomes V−>Vshort and an event E14 in which V−>Vshort exceeds the sixth predetermined time.

In the time-shortening mode state MD12, a transition is made to a discharge overcurrent detection state MD17 of the normal mode when an event E15 occurs in which V−>Vdet3 exceeds the fifth predetermined time. In addition, in the time-shortening mode state MD12, a transition is made to an overcharge voltage detection state MD13 of the normal mode when VDD>Vdet1 exceeds the second predetermined time.

In the time-shortening and charge overcurrent detection state MD11, a transition is made to a charge overcurrent detection state MD16 of the normal mode when an event E16 in which VDD>Vdet1 and the overcharge voltage detection signal is generated.

The normal mode state MD14 is an example of a normal mode in which the voltages at the power terminal and the overcurrent detection terminal are monitored. The time-shortening mode and overcharge voltage detection state MD11 and the time-shortening mode state MD12 are examples of a time-shortening mode in which the predetermined delay times for detecting the overcharge, the overdischarge, and the overcurrent in the abnormality detection part are shortened. The overcharge voltage detection state MD13, the overdischarge voltage detection state MD15, the charge overcurrent detection state MD16, the discharge overcurrent detection state MD17, and the short-circuit detection state MD18 are examples of a protection mode in which a signal is output to stop a charge current or a discharge current when an abnormality is detected by the abnormality detection part in the normal mode. The time-shortening mode state MD12 is an example of a time-shortening monitor mode, and the time-shortening and overcharge voltage detection state MD11 is an example of a time-shortening overcharge voltage detection mode.

According to the embodiment and the modification described above, the number of terminals may be prevented from increasing in order to set the time-shortening mode, and the testing of each of detection functions may be enabled when the time-shortening mode is set.

Further, the present invention is not limited to these embodiments, but various variations and modification may be made without departing from the scope of the present invention.

What is claimed is:

1. A charge and discharge control circuit to control charge and discharge of a secondary battery, comprising:

a power terminal configured to receive power from the secondary battery;

an overcurrent detection terminal configured to detect an overcurrent of the secondary battery;

an abnormality detection part set with predetermined delay times for detecting an overcharge, an overdischarge, and an overcurrent; and a mode control part configured to control a plurality of modes of operation, wherein the mode control part includes
  managing a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode;
  making a transition from the normal mode to the time-shortening mode when the voltage at the power terminal monitored by the abnormality detection part exceeds a first predetermined voltage;
  making a transition from the time-shortening mode to the protection mode when either one of the overdischarge and the overcurrent is detected by the abnormality detection part;
  wherein the protection mode includes an overcharge protection mode in which the overcharge current is detected by one of the predetermined delay times of the abnormality detection part,
  wherein the time-shortening mode includes a time-shortening monitor mode in which voltages at the power terminal and the overcurrent detection terminal are monitored by the abnormality detection part, and a time-shortening overcharge voltage detection mode in which the signal to stop the charge current is output when the overcharge is detected by the abnormality detection part, and
  making a transition to the time-shortening overcharge voltage detection mode when the overcharge is detected in the time-shortening monitor mode, making a transition to the time-shortening monitor mode when the overcharge detection of the abnormality detection part ends, and making a transition to the overcharge protection mode when the voltage at the overcurrent detection terminal is lower than a second predetermined voltage in the time-shortening overcharge voltage detection mode.

2. The charge and discharge control circuit as claimed in claim 1, further comprising:
a signal output part configured to output a signal to stop the charge current or the discharge current when the abnormality is detected by the abnormality detection part in the normal mode,
wherein the signal output part outputs the signal to stop the charge current when the abnormality detection part detects the overcharge in the time-shortening overcharge voltage detection mode.

3. A charge and discharge control circuit to control charge and discharge of a secondary battery, comprising:
a power terminal configured to receive power from the secondary battery;
an overcurrent detection terminal configured to detect an overcurrent of the secondary battery;
an abnormality detection part set with predetermined delay times for detecting an overcharge, an overdischarge, and an overcurrent; and
a mode control part configured to control a plurality of modes of operation,
wherein the mode control part includes
managing a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode;
making a transition from the normal mode to the time-shortening mode when a voltage at the overcurrent detection terminal monitored by the abnormality detection part exceeds a first predetermined voltage;
making a transition from the time-shortening mode to the protection mode when either one of the overdischarge and the overcurrent is detected by the abnormality detection part;
wherein the protection mode includes a charge overcurrent protection mode in which the charge overcurrent is detected by one of the predetermined delay times of the abnormality detection part,
wherein the time-shortening mode includes a time-shortening monitor mode in which the voltages at the power terminal and the overcurrent detection terminal are monitored by the abnormality detection part, and a time-shortening charge overcurrent detection mode in which the signal to stop the charge current is output when the charge overcurrent is detected by the abnormality detection part, and
making a transition to the time-shortening charge overcurrent detection mode when the charge overcurrent is detected by the abnormality detection part in the time-shortening monitor mode, making a transition to the time-shortening monitor mode when the charge overcurrent detection of the abnormality detection part ends, and making a transition to the charge overcurrent protection mode when the voltage at the power terminal monitored by the abnormality detection part exceeds a second predetermined voltage in the time-shortening charge overcurrent detection mode.

4. The charge and discharge control circuit as claimed in claim 3, further comprising:
a signal output part configured to output a signal to stop the charge current or the discharge current when the abnormality is detected by the abnormality detection part in the normal mode,
wherein the signal output part outputs the signal to stop the charge current when the abnormality detection part detects the charge overcurrent in the time-shortening charge overcurrent detection mode.

5. A charge and discharge control method to control charge and discharge of a secondary battery by a charge and discharge control circuit that includes a power terminal configured to receive power from the secondary battery, an overcurrent detection terminal configured to detect an overcurrent of the secondary battery, an abnormality detection part set with predetermined delay times for detecting an overcharge, an overdischarge, and an overcurrent, and a mode control part configured to control a plurality of modes of operation, the charge and discharge control method comprising:
managing, by the mode control part, a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode;
making, by the mode control part, a transition from the normal mode to the time-shortening mode when the voltage at the power terminal monitored by the abnormality detection part exceeds a first predetermined voltage;
making, by the mode control part, a transition from the time-shortening mode to the protection mode when either one of the overdischarge and the overcurrent is detected by the abnormality detection part;
wherein the protection mode includes an overcharge protection mode in which the overcharge current is detected by one of the predetermined delay times of the abnormality detection part,
wherein the time-shortening mode includes a time-shortening monitor mode in which voltages at the power terminal and the overcurrent detection terminal are monitored by the abnormality detection part, and a time-shortening overcharge voltage detection mode in which the signal to stop the charge current is output when the overcharge is detected by the abnormality detection part, and
making, by the mode control part, a transition to the time-shortening overcharge voltage detection mode when the overcharge is detected by the abnormality detection part in the time-shortening monitor mode, a transition to the time-shortening monitor mode when the overcharge detection of the abnormality detection part ends, and a transition to the overcharge protection mode when the voltage at the overcurrent detection terminal monitored by the abnormality detection part is lower than a second predetermined voltage in the time-shortening overcharge voltage detection mode.

6. The charge and discharge control method as claimed in claim 5, wherein the charge and discharge control circuit further includes a signal output part configured to output a signal to stop the charge current or the discharge current when the abnormality is detected by the abnormality detection part in the normal mode, and wherein the charge and discharge control method further comprises:

outputting, from the signal output part, the signal to stop the charge current when the abnormality detection part detects the overcharge in the time-shortening overcharge voltage detection mode.

7. A charge and discharge control method to control charge and discharge of a secondary battery by a charge and discharge control circuit that includes a power terminal configured to receive power from the secondary battery, an overcurrent detection terminal configured to detect an overcurrent of the secondary battery, an abnormality detection part set with predetermined delay times for detecting an overcharge, an overdischarge, and an overcurrent, and a mode control part configured to control a plurality of modes of operation, the charge and discharge control method comprising:

managing, by the mode control part, a normal mode in which voltages at the power terminal and the overcurrent detection terminal are monitored by the abnormality detection part, a time-shortening mode in which the predetermined delay times of the abnormality detection part are shortened, and a protection mode in which a signal is output to stop a charge current or a discharge current when an abnormality is detected by the abnormality detection part in the normal mode;

making, by the mode control part, a transition from the normal mode to the time-shortening mode when a voltage at the overcurrent detection terminal monitored by the abnormality detection part exceeds a second predetermined voltage;

making, by the mode control part, a transition from the time-shortening mode to the protection mode when either one of the overdischarge and the overcurrent is detected by the abnormality detection part;

wherein the protection mode includes a charge overcurrent protection mode in which the charge overcurrent is detected by one of the predetermined delay times of the abnormality detection part, wherein the time-shortening mode includes a time-shortening monitor mode in which the voltages at the power terminal and the overcurrent detection terminal are monitored by the abnormality detection part, and a time-shortening charge overcurrent detection mode in which the signal to stop the charge current is output when the charge overcurrent is detected by the abnormality detection part, and making, by the mode control part, a transition to the time-shortening charge overcurrent detection mode when the charge overcurrent is detected by the abnormality detection part in the time-shortening monitor mode, a transition to the time-shortening monitor mode when the charge overcurrent detection of the abnormality detection part ends, and a transition to the charge overcurrent protection mode when the voltage at the power terminal monitored by the abnormality detection part exceeds a second predetermined voltage in the time-shortening charge overcurrent detection mode.

8. The charge and discharge control method as claimed in claim 7, wherein the charge and discharge control circuit further includes a signal output part configured to output a signal to stop the charge current or the discharge current when the abnormality is detected by the abnormality detection part in the normal mode, and wherein the charge and discharge control method further comprises:

outputting, from the signal output part, the signal to stop the charge current when the abnormality detection part detects the charge overcurrent in the time-shortening charge overcurrent detection mode.

* * * * *